W. L. TOBEY.
UNDER WATER EXHAUST OUTLET FOR INTERNAL COMBUSTION ENGINES.
APPLICATION FILED JUNE 24, 1909.
940,291.
Patented Nov. 16, 1909.
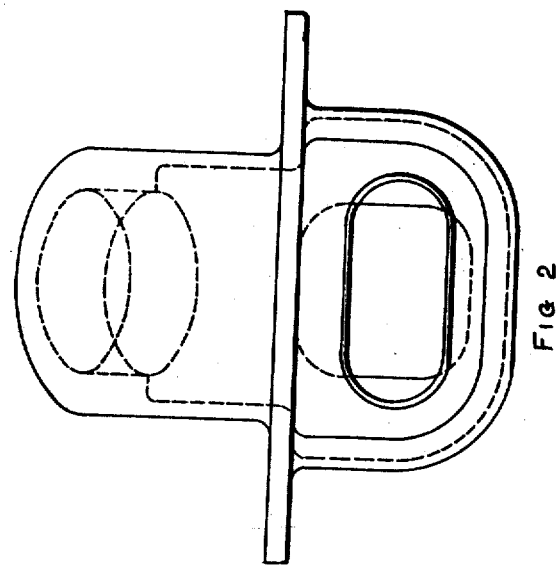
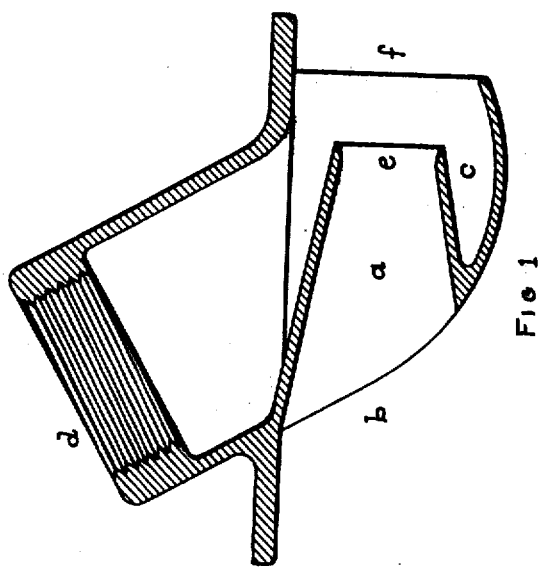
WITNESSES:
INVENTOR.
William Laighton Tobey

UNITED STATES PATENT OFFICE.

WILLIAM LAIGHTON TOBEY, OF WINTHROP, MASSACHUSETTS.

UNDER-WATER EXHAUST-OUTLET FOR INTERNAL-COMBUSTION ENGINES.

940,291. Specification of Letters Patent. Patented Nov. 16, 1909.

Application filed June 24, 1909. Serial No. 504,203.

*To all whom it may concern:*

Be it known that I, WILLIAM LAIGHTON TOBEY, of Winthrop, in the county of Suffolk and State of Massachusetts, have invented certain new and useful Improvements in Under-Water Exhaust-Outlets for Internal-Combustion Engines, of which the following is a specification.

My invention relates to under water outlets for exhaust gases from internal combustion engines and has for its object to reduce the back pressure due to the head of water against which the exhaust gases are delivered. I accomplish this in the following manner.

Referring to the drawings Figure 1. shows in section a side view, and Fig. 2. an end view of my invention.

In Fig. 1. the water inlet chamber *a.* has an inlet opening at *b.* through the forward shell of the exhaust chamber *c.* The area of the water inlet opening *b.* is approximately the size of the exhaust pipe leading to the exhaust inlet *d.* The water outlet *e.* is substantially the same area as the water inlet *b.* The water inlet chamber *a.* is contained within the exhaust chamber *c.* and the water outlet *e.* is approximately concentric with the exhaust outlet *f.* The area of the exhaust outlet *f.* is approximately the same as the combined water inlet area and the area of the exhaust pipe.

The operation of my device is as follows. The exhaust chamber or nozzle is fastened on the side or run of a boat, below and near the water line with the inlet opening *b.* facing forward to receive the flow of water due to the passage of the boat through the water. The rapid flow of water through the inlet chamber *a.* and out of the outlet *e.* and through the concentric exhaust outlet *f.* causes the gas in the exhaust chamber *c.* to be carried along with this jet of water, forming a partial vacuum and reducing the back pressure against which the exhaust would be delivered due to its location below the surface of the water.

Having thus described my invention, what I claim as new and desire to secure by Letters Patent is.

1. In an under water exhaust nozzle, the combination of an exhaust chamber, with a contained water inlet chamber having its water outlet approximately concentric with the exhaust outlet substantially as described.

2. In an under water exhaust nozzle the combination of an exhaust chamber with a contained water inlet nozzle having its water outlet approximately the same area as the exhaust inlet pipe and concentric with the exhaust outlet substantially as described.

3. In an under water exhaust nozzle, the combination of an exhaust chamber with a contained water inlet chamber having water inlet and outlet orifice of approximately the same area, and with water outlet approximately concentric with exhaust outlet substantially as described.

4. In an under water exhaust nozzle an exhaust chamber having an opening in the forward shell, of approximately the same area as the exhaust inlet pipe, said opening to project a jet concentric with and approximately half the area of the exhaust outlet.

In testimony whereof I have affixed my signature, in presence of two witnesses.

WILLIAM LAIGHTON TOBEY.

Witnesses:
FORREST E. LOVEJOY,
ROGER P. TOBEY.